United States Patent
Fleming

(10) Patent No.: US 8,136,040 B2
(45) Date of Patent: Mar. 13, 2012

(54) AUDIO VARIANCE FOR MULTIPLE WINDOWS

(75) Inventor: Hoyt Fleming, Boise, ID (US)

(73) Assignee: Apple Inc., Cupertino, CA (US)

( * ) Notice: Subject to any disclaimer, the term of this patent is extended or adjusted under 35 U.S.C. 154(b) by 591 days.

(21) Appl. No.: 11/804,158

(22) Filed: May 16, 2007

(65) Prior Publication Data

US 2008/0288876 A1    Nov. 20, 2008

(51) Int. Cl.
*G06F 3/00* (2006.01)
(52) U.S. Cl. .......................................... 715/716; 715/790
(58) Field of Classification Search .................. 715/761, 715/716, 790
See application file for complete search history.

(56) References Cited

U.S. PATENT DOCUMENTS

| 5,289,546 | A * | 2/1994 | Hetherington ................ 381/104 |
| 6,567,086 | B1 * | 5/2003 | Hashimoto .................... 345/427 |
| 7,676,761 | B2 * | 3/2010 | Oliver et al. .................. 715/803 |
| 2004/0201608 | A1 * | 10/2004 | Ma et al. ........................ 345/719 |
| 2007/0083825 | A1 * | 4/2007 | Chaudhri et al. ............. 715/788 |
| 2007/0288863 | A1 * | 12/2007 | Ording et al. ................. 715/788 |
| 2008/0248797 | A1 * | 10/2008 | Freeman et al. .............. 455/425 |

* cited by examiner

*Primary Examiner* — Sara England
(74) *Attorney, Agent, or Firm* — Blakely, Sokoloff, Taylor & Zafman LLP

(57) ABSTRACT

Systems and methods for varying the audio of multiple windows on a personal computer are provided. The windows may overlap in various configurations. These configurations may cause the audio associated with media playing in each media window that is overlapped to be varied in a number of different ways. The audios may be scaled in response to a set of user preferences.

34 Claims, 10 Drawing Sheets

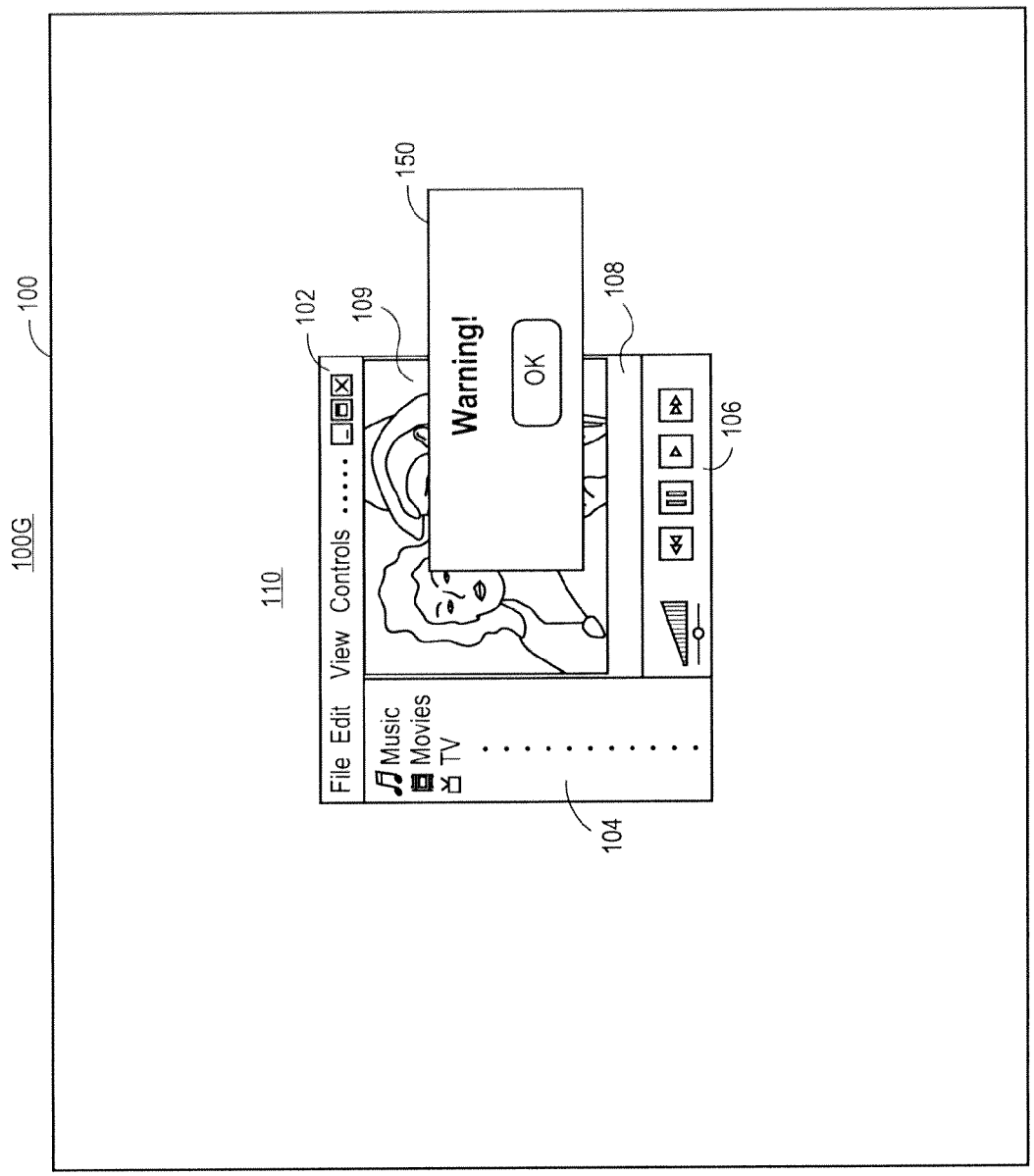

AUDIO VARIANCE FOR MULTIPLE WINDOWS

BACKGROUND OF THE INVENTION

Embodiments of the invention generally pertain to systems and methods for varying sources of audio in an interactive interface, or more particularly, to varying the audio of windows in an interactive operating system environment.

Computers typically enable user interaction through an operating system, which includes a set of computer programs that manage the hardware and software of the computer. Operating systems may enable user interaction via text commands in a command line interface, or via mouse and keyboard input in a graphical user interface, or GUI. One of the more common GUI interfaces is a windows based GUI. In a windows based GUI, computer programs are visually organized in panels referred to as windows.

Each program in an operating system may be associated with its own particular window. In addition, certain programs may be associated with multiple windows. The amount of windows that may be associated with a particular program may increase or decrease depending on either user initiated interactions with the program, operating system initiated interactions with the program, or both. In addition, the window or windows for a particular program may be moved, resized, minimized, maximized, or any combination thereof, in the viewable display space of a GUI by the user, the operating system, or both. For example, a media player application may be enlarged by the user so that audio/video media playing in the media player takes up a larger part of the viewable display space of a GUI.

The display space of a GUI may become crowded when multiple windows are displayed simultaneously. These windows may overlap, causing portions of a window or windows to be obscured to the user. The user may become inundated when multiple windows are displayed simultaneously, making it difficult for a user to differentiate among windows. Windows that are playing media content, such as audio/video media, may no longer be fully visible to a user. Thus, portions of media content may no longer be fully visible to a user.

Accordingly, in view of the foregoing, there is a continuing interest in varying the audio of the playing media in overlapping windows in an interactive operating system environment for both practical and aesthetic purposes.

SUMMARY OF THE INVENTION

The audio of a media playing window may be adjusted when the media playing window is at least partially overlapped by another window. The windows may overlap in various configurations. These configurations may cause the audio associated with media playing in each media window that is overlapped to be varied in one of a number of different ways. In one embodiment, an overlap percentage is calculated. The overlap percentage may represent the portion of a particular window that is visible in a user's display, the portion of a particular window that is not visible in a user's display, the portion of the media content in the particular window that is visible in a user's display, or the portion of the media content in the particular window that is not visible in a user's display. The overlap percentage may be used as a factor in adjusting the audio of the playing media in the media playing window that has been overlapped.

In another embodiment, the number of overlapping windows that overlap a media playing window is determined. This number may be used as a factor in adjusting the audio of the playing media in the media playing window that has been overlapped.

In certain embodiments, user input, such as mouse clicks or keyboard strokes, may be received to position an overlapping over a media playing window. In other embodiments, the overlapping window may be automatically positioned over a portion of a media playing window—for example, the operating system may cause a warning window to automatically appear over a media playing window.

The audio may be scaled in a variety of ways. In one embodiment, the volume level of audio of the playing media may be reduced. In another embodiment, the volume level of the audio of the playing media may be scaled according to a logarithmic scale. In yet another embodiment, the volume level of the audio of the playing media may be scaled according to a linear scale. In yet another embodiment, the audio of the playing media may be filtered to limit certain frequencies in the audio.

In certain embodiments, user defined preferences may be used as a factor in adjusting the audio of the playing media. The user preferences may be associated with an operating system, a particular computer application, or any suitable program. The user preferences may specify how the particular computer program will adjust the audio of the playing media according to the relative positions of the windows, as well as how the audio itself can be scaled.

In certain embodiments, media playing window visibility parameters may be determined for a media playing window of a media player. The visibility parameters can include the percentage of a media playing window not overlaid by another window, the percentage of a media playing window displayed on a computer display, the number of other windows overlapping the media playing window, which portions of the media playing window are covered, which portions of the media playing window that are visible on a computer display, the number of visible corners of the media playing window, the portion of the border of the media playing window that is covered, the portion of the border of the media playing window that is visible on a computer display, whether the media playing window is the foremost window in the GUI, whether the media playing window is partially "off screen" of the computer display, or whether the media playing window is minimized. The audio of the playing media may be adjusted based on the determined visibility parameters. In addition, the visibility parameters may change in response to a window overlapping a portion of a media playing window. In certain embodiments, the volume level may be adjusted when the media playing window is being moved.

In certain embodiments, the volume level of the audio may be adjusted between a negligible volume level and a fully visible volume level. The fully visible volume level may be defined as the volume level of the audio originally set by the program or operating system controlling the media playing window.

Generally, the systems and methods for varying the audio of multiple windows on a personal computer are implemented in machine-readable media (e.g. software). However, certain aspects of the disclosed systems and methods, such as audio filtering, may be realized in dedicated audio processing circuitry.

BRIEF DESCRIPTION OF THE DRAWINGS

The above and other advantages of the invention will be apparent upon consideration of the following detailed description, taken in conjunction with the accompanying drawings, in which like reference characters refer to like parts throughout, and in which:

FIGS. 1B-1G show illustrative screens showing windows arranged in various configurations in accordance with embodiments of the invention.

DETAILED DESCRIPTION

Systems and methods for varying the audio of the media content playing in a media playing window are provided. Media playing windows can exist as part of an interactive operating system environment such as Microsoft Windows-based operating systems such as Windows XP and Windows Vista, Mac OS X based operating systems such as Tiger (Mac OS X v10.4), Linux based operating systems such as Fedora, or other suitable operating systems with a graphical user interface, or GUI. One common example of a media playing window is a QUICKTIME™ movie window. Alternatively, the media playing windows can exist as part of a GUI that is not associated with an interactive operating system environment.

When adjusting the audio of the media content playing in a media playing window, the volume of the audio may be scaled. The phrase "volume of the audio" refers to (1) an amplitude, such as peak, average, or root-mean-square ("RMS") amplitude of an analog electrical signal that is input into a sound producing transducer, such as a speaker; (2) an amplitude, such as peak, average, or RMS amplitude of the sound pressure output by such a transducer; and/or (3) the amplitude of a sample in a series of samples that, when combined, form digital audio. The volume of the audio may be measured in a linear or a logarithmic scale—e.g. decibels (db).

Figure 1A:
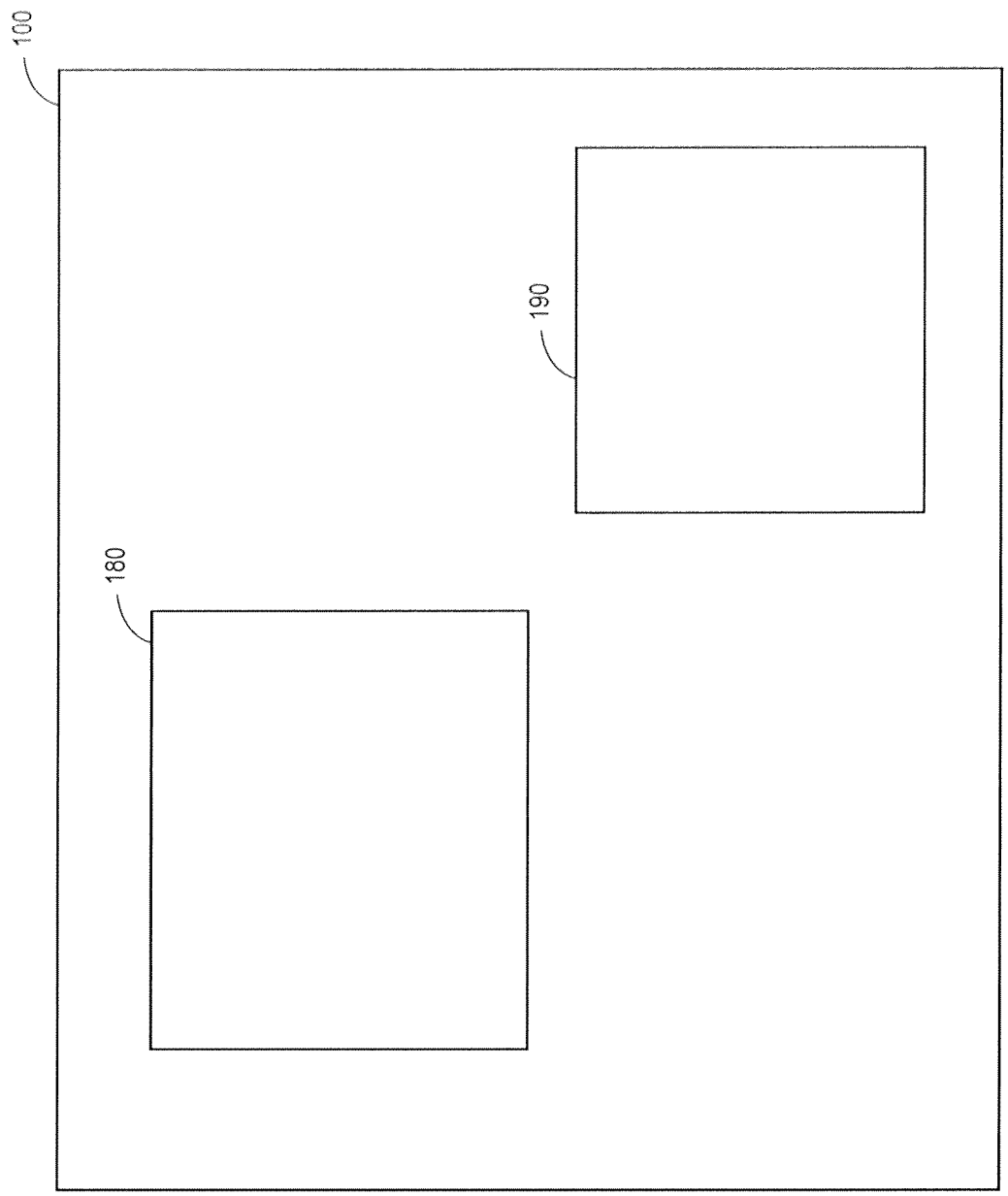
FIG. 1A shows a block diagram of a screen displaying multiple windows in accordance with an embodiment of the invention.

FIG. 1A shows an illustrative view of a screen 100 showing a first window 180 and a second window 190 in a GUI. First window 180 may be a media playing window that is playing an audio associated with the playing media in the window at a particular volume level. Second window 190 may be any window in the interactive operating system environment associated with a program such as another media player, a spreadsheet, a computer game, or any suitable computer program. Screen 100 may contain any number of such windows, such as 1, 2, 3, 5, 10, 15, 20, 50, 100, or more than 100 windows. Window 190 may be operable to be positioned over at least a portion of the first window 180. Thus, second window 190 may overlap a portion of first window 180, and the audio of the playing media in the first window 180 may be adjusted in response to being at least partially overlapped by window 190. The audio of the playing media in the first window 180 may be scaled in various ways. These adjustment mechanisms are disclosed below in the examples illustrated in FIGS. 1B-1G.

In certain embodiments, the audio of the playing media in the first window 180 may be adjusted based on determined visibility parameters. The visibility parameters may be based on how portions of first window 180 are visible on screen 100, how first window 180 is being acted upon by user input, how first window 180 is being acted upon by an interactive operating system environment which manages the GUI, or a combination of such parameters. In certain embodiments, the visibility parameters may change in response to changes in the positions of the window or windows that are overlapping first window 180. These visibility parameters and their role in the adjustment of audio associated with playing media in media playing windows are discussed below in the examples illustrated in FIGS. 1B-1G.

In certain embodiments, the volume of the audio may be adjusted between a negligible volume level and a maximum volume level. The maximum volume level may be defined as the volume level of the audio set by the program or operating system. This volume level may act as a baseline from which the disclosed invention reduces the volume.

Figure 1B:
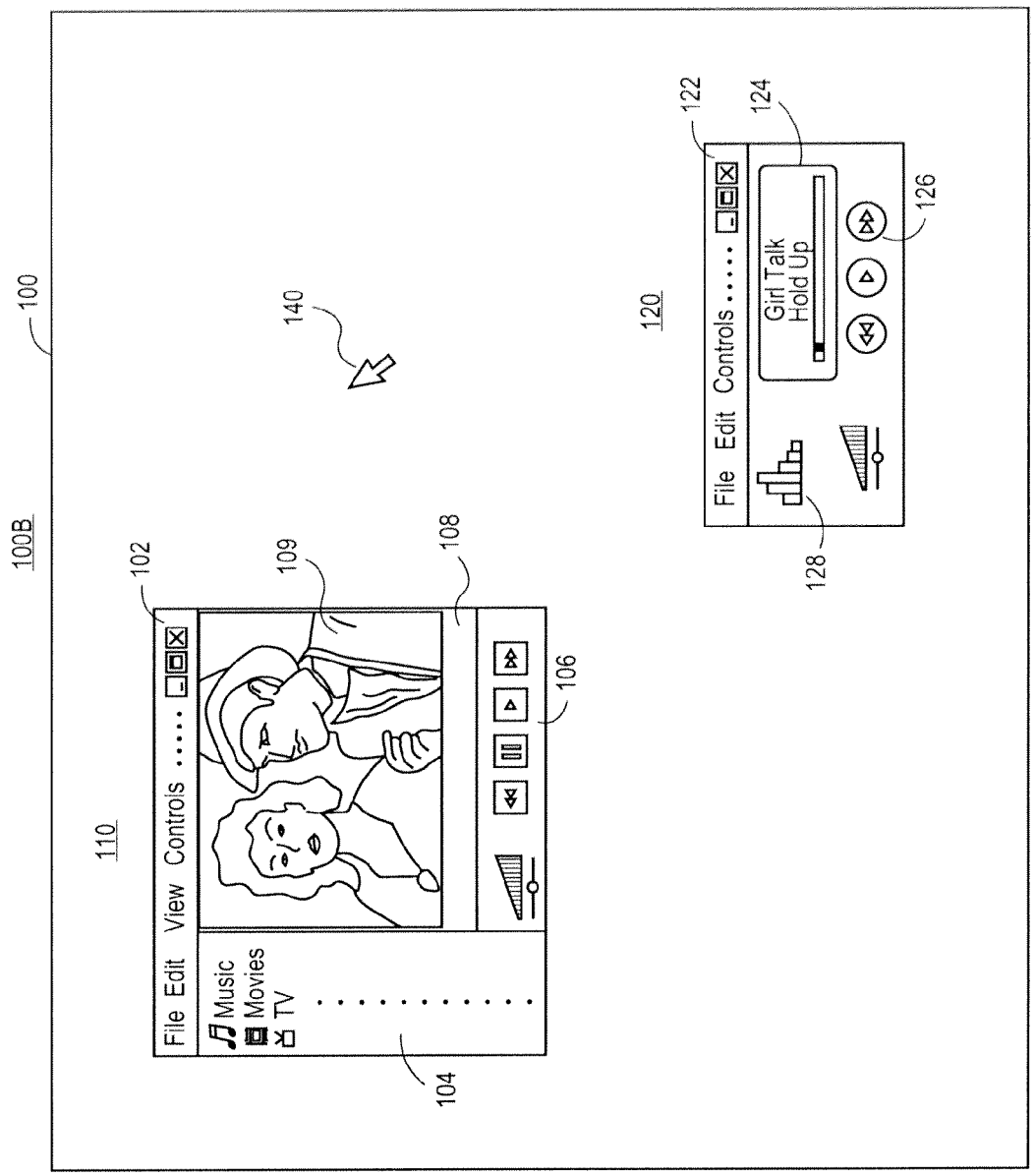

FIG. 1B shows an illustrative view of screen 100B showing two windows: video player window 110 and audio player window 120. Video player window 110 can include operating system control bar 102, media viewing pane 108 showing media content 109, media control bar 106, and organizational pane 104. The window may be of any suitable visual appearance—for example, the window may be rectangular, or its borders may be curved. Operating system control bar 102 may include buttons users can select, for example, to maximize, minimize, resize, and close video player window 110. Maximizing video player window 110 may cause the window showing video player window 110 to expand and consume all of screen 100. Minimizing video player window 110 may cause the window showing video player window 110 to disappear from screen 100 for later maximization or resizing via a dock or task bar (not shown) showing a list of all user programs running in the operating system. Resizing video player window 110 may cause the visual components of video player window 110 to expand proportionally and take up a larger portion of screen 100. Closing video player window 110 may cause the window showing video player window 110 to disappear from screen 100 and cause the program underlying video player window 110 to stop running.

In addition, operating system control bar 102 may allow video player window 110 to be relocated by user operated stylus 140 to a new location in screen 100. Also, operating system control bar 102 can have handles such as 'File' and 'Edit' to access menus and submenus of options to control various aspects of video player window 110.

Media viewing pane 108 can include the space in which audio/video media may be displayed. When played, the audio/video media may appear as media content 109. The space occupied by media content 109 in screen 109 may be less than or equal to the amount of space available in media viewing pane 108. Media control bar 106 can include controls such as play, pause, fast forward, rewind, or any suitable temporal video controls. In addition, media control bar 106 may contain an audio control for adjusting the volume of the audio of media content 109. Organizational pane 104 may contain controls to access a library of audio/video media, or any other suitable media content.

Audio player window 120 can include a window, an operating system control bar 122, audio display pane 124, audio control bar 126, and audio visualization information 128. Operating system control bar 122 may be substantially similar to operating system control bar 102 of video player window 110. As such, operating system control bar 102 may allow audio player window 120 to be maximized, minimized, resized, and relocated within screen 100 in a similar fashion as that disclosed with respect to video player window 110. Audio display pane 124 can display information about the playing media in audio player window 120 such as song title, album title, playing time elapsed, and/or other suitable information about the playing media. Audio control bar 126 may be substantially similar to media control bar 106 disclosed with respect to video player window 110, except that audio control bar 126 controls the playing media in audio player window 120. Audio visualization information 128 may include spectrograms or any other suitable audio visualization information.

Maximizing, resizing, or relocating video player window 110 may cause video player window 110 to overlap at least a portion of other windows on screen 100. In one example, expanding the size of video player window 110 may cause video player window 110 to overlap a portion of audio player window 120. In another example, relocating video player window 110 to the bottom right corner of screen 100 may cause video player 110 to overlap a portion of audio player window 120. In yet another example, maximizing video player 110 may cause video player 110 to completely overlap audio player 120.

Figure 1C:
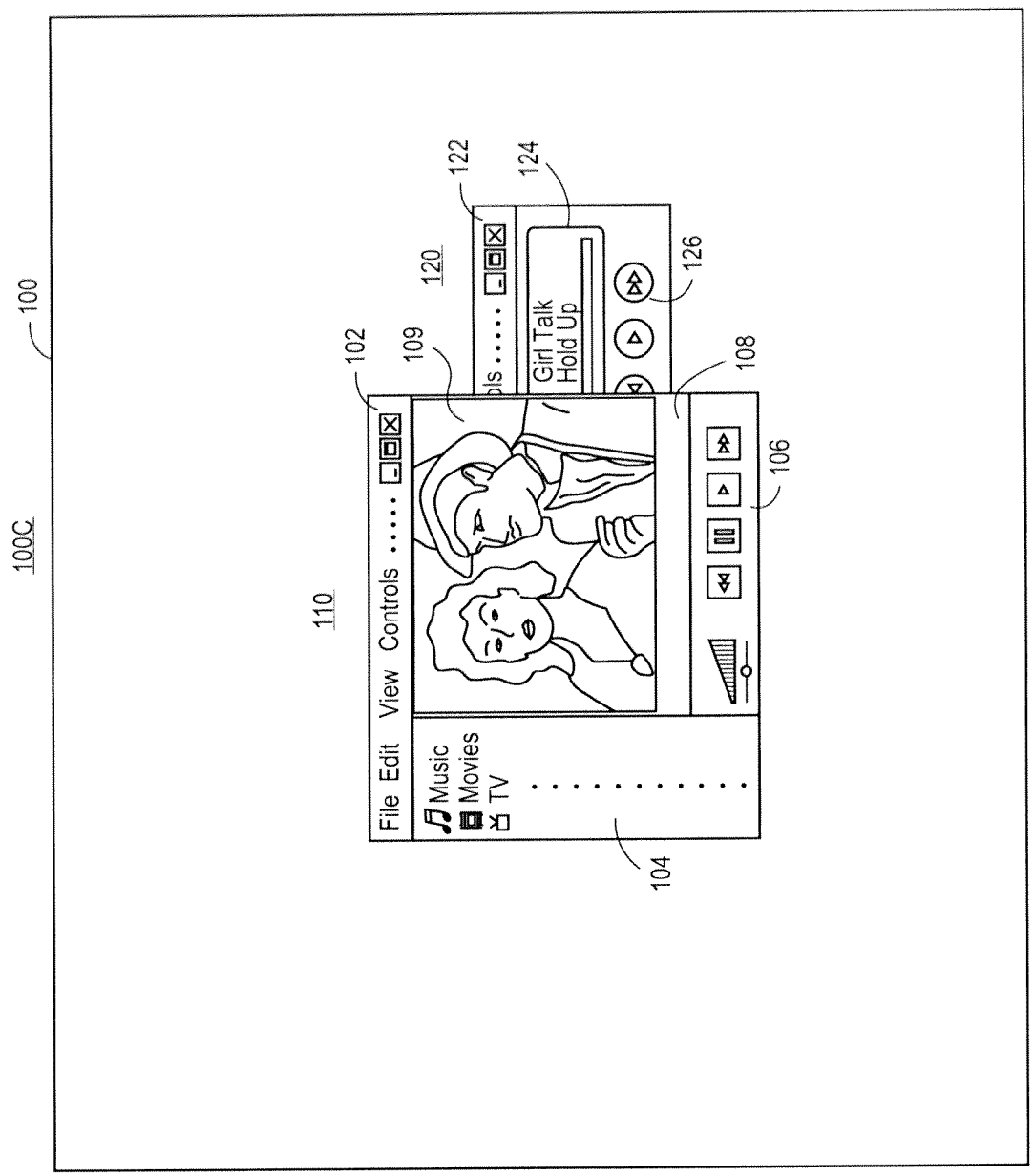

FIG. 1C shows an illustrative view of screen 100C showing the video player window 110 and audio player window 120. As shown, video player window 110 partially overlaps audio player window 120. Thus, a portion of audio visualization information 128, and operating system control bar 122 and audio control bar 126 are no longer visible on screen 100.

In certain embodiments, the volume of the audio associated with playing media in audio player window 120 may be scaled. This scaling may not be due to user interaction with audio player window 120, such as the user manipulation of audio control bar 126. Rather, the scaling may be due to a computer program that is triggered by visibility parameters of the audio player window 120, as described below. In one embodiment, volume of the audio may be completely muted based on the fact that window of audio player window 120 is no longer the foremost video in screen 100. In other embodiments, the volume of the audio may be reduced based on the fact that a portion of the window of audio player window 120 is no longer fully visible in screen 100. Audio player window 120 may be no longer fully visible in screen 100 due to an overlapping window, audio player window 120 being positioned partially off screen, audio player window 120 being minimized in the GUI, or any other number of reasons. In other embodiments, the volume of the audio may be reduced based on what portion of the window of audio player window 120 is visible in screen 100. These portions may be calculated as percentages. In one embodiment, the volume of the audio may be linearly reduced based on an overlap percentage. The overlap percentage may be calculated as the portion of audio player window 120 that is no longer visible in screen 100, the portion of audio player window 120 that is visible in screen 100, or the portion of audio player window 120 that is off screen in screen 100. In one embodiment, the volume of the audio may be linearly scaled. The linear scaling may be based on the overlap percentage. For example, if only 80% of audio player window 120 is visible in screen 100, then the amplitude of the audio may be reduced to 80% of its original amplitude. In another embodiment, the volume of the audio may be logarithmically scaled. The logarithmic scaling may be based on the overlap percentage. For example, if only 80% of audio player window 120 is visible in screen 100, then the amount of decibels of the audio may be reduced to 80% of its original amount of decibels. In certain embodiments, the criteria for reducing the volume of the audio based on the portion of the window that is visible may be user selected.

In other embodiments, the volume of the audio associated with playing media in audio player window 120 may be reduced based on the portion of the border of audio player window 120 that is visible in screen 100, or the portion of the border that is not visible in screen 100. The portion of the border that is visible may be measured as the number of visible corners, the visible portion of the perimeter of the border, or any other suitable measurement. For example, as shown in FIG. 1C, only half of the corners of the window of audio player window 120 are visible in screen 100. Thus, the volume of the audio may be reduced to 50% of its original volume. In another example, as shown in FIG. 1C, only about 70% of the perimeter of the border of the window of audio player window 120 is visible. Thus, the volume of the audio may be reduced to 70% of its original volume. These reductions may be linear or logarithmic as disclosed above. In certain embodiments, the criteria for reducing the volume of the audio based on the visible portion of the border of the window may be user selected.

In other embodiments, the volume of the audio associated with playing media in audio player window 120 may be reduced based on the particular elements within the window of audio player window 120 that are overlapped by overlapping windows in screen 100. For example, if audio display pane 124, audio control bar 126, or audio visualization information 128 are partially or fully overlapped by other windows in screen 100, the volume of the audio may be reduced by a certain percentage. This percentage may be 5, 10, 15, 20, 25, 30, or more than 30 percent per component of audio player window 120 partially or fully overlapped by other windows in screen 100. The reduction in volume may be linear or logarithmic as disclosed above. In certain embodiments, the percentage per component may be user selected.

In various embodiments disclosed above, the audio associated with playing media in audio player window 120 may be digitally processed. The digital processing may filter the audio or apply specialized signal processing techniques. The filter may be a high-pass filter, a low-pass filter, a combination of a high-pass filter and a low-pass filter, or any suitable audio filter. The digital signal processing may apply an echo effect, flanger effect, phaser effect, or any suitable audio effect. In one example, a high-pass filter may be used. The high pass filter may cause the audio to sound muffled, as if it were originating from an adjacent room in the user's home. In another example, the audio may be digitally processed to add an echo effect. The effects added to the audio may be added for aesthetic purposes than for practical purposes. In certain embodiments, the digital filters/audio effects may be user selected.

Figure 1D:
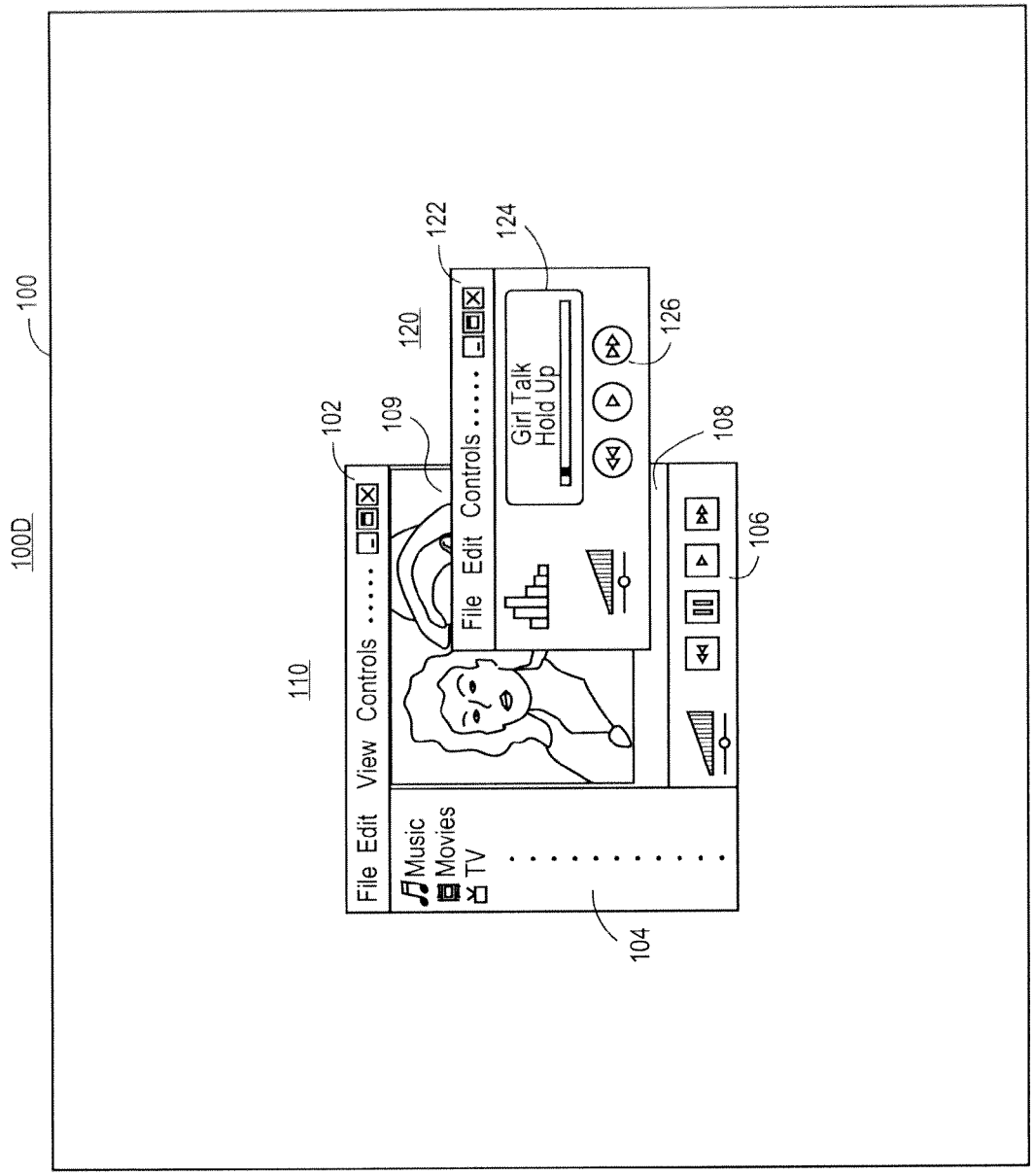

FIG. 1D shows an illustrative view of screen 100D showing the video player window 110 and audio player window 120. As shown, audio player window 120 partially overlaps video player window 110. A portion of media viewing pane 108 showing media content 109 is no longer visible in screen 100.

In certain embodiments, the volume of the audio associated with playing media in video player window 110 may be scaled. In one embodiment, the volume of the audio may be completely muted based on the fact that window of video player window 110 is no longer the foremost video in screen 100. In other embodiments, the volume of the audio may be reduced based on the portion of the window of video player window 110 that is no longer fully visible in screen 100. This portion may be calculated as an overlap percentage. The overlap percentage may be calculated as the percentage of the window of video player window 110 no longer visible, the percentage of video player window 110 that is visible, the portion of video display pane 108 no longer visible, the portion of video display pane 108 that is visible, the portion of media content 109 no longer visible, the portion of media content 109 that is visible, or any other suitable portion of video player window 110. The volume of the audio may be linearly or logarithmically reduced based on this percentage similar to the approach disclosed with respect to audio player window 120 in FIG. 1C. In certain embodiments, the criteria for reducing the volume of the audio based on the portion of the window that is visible may be user selected.

In other embodiments, the volume of the audio associated with playing media in video player window 110 may be reduced based on the portion of the border of video player window 120 that is visible in screen 100, or the portion of the border of video player window 120 that is not visible in screen 100. The portion of the border visible may be measured similar to the approach disclosed with respect to audio player window 120 in FIG. 1C. In addition, the volume scaling may be linear or logarithmic as disclosed above. In certain embodiments, the criteria for reducing the volume of the audio based on the portion of the border of the window that is visible may be user selected.

In other embodiments, the volume of the audio associated with playing media in video player window 110 may be reduced based on the fact that particular elements within the window of video player window 110 are overlapped by other windows in screen 100. For example, if the organization pane 104 is overlapped by other windows in screen 100, the volume of the audio may be reduced by a certain percentage. This percentage may be 5, 10, 15, 20, 25, 30, or more than 30 percent per component of audio player window 120 overlapped by other windows in screen 100. The volume scaling may be linear or logarithmic as disclosed above. In certain embodiments, the percentage per component may be user selected.

In various embodiments disclosed above, the audio associated with playing media in video player window 110 may be digitally processed. The digital processing may be similar to that disclosed with respect to audio player window 120 in FIG. 1C. In certain embodiments, the digital filters/audio effects may be user selected.

Figure 1E:
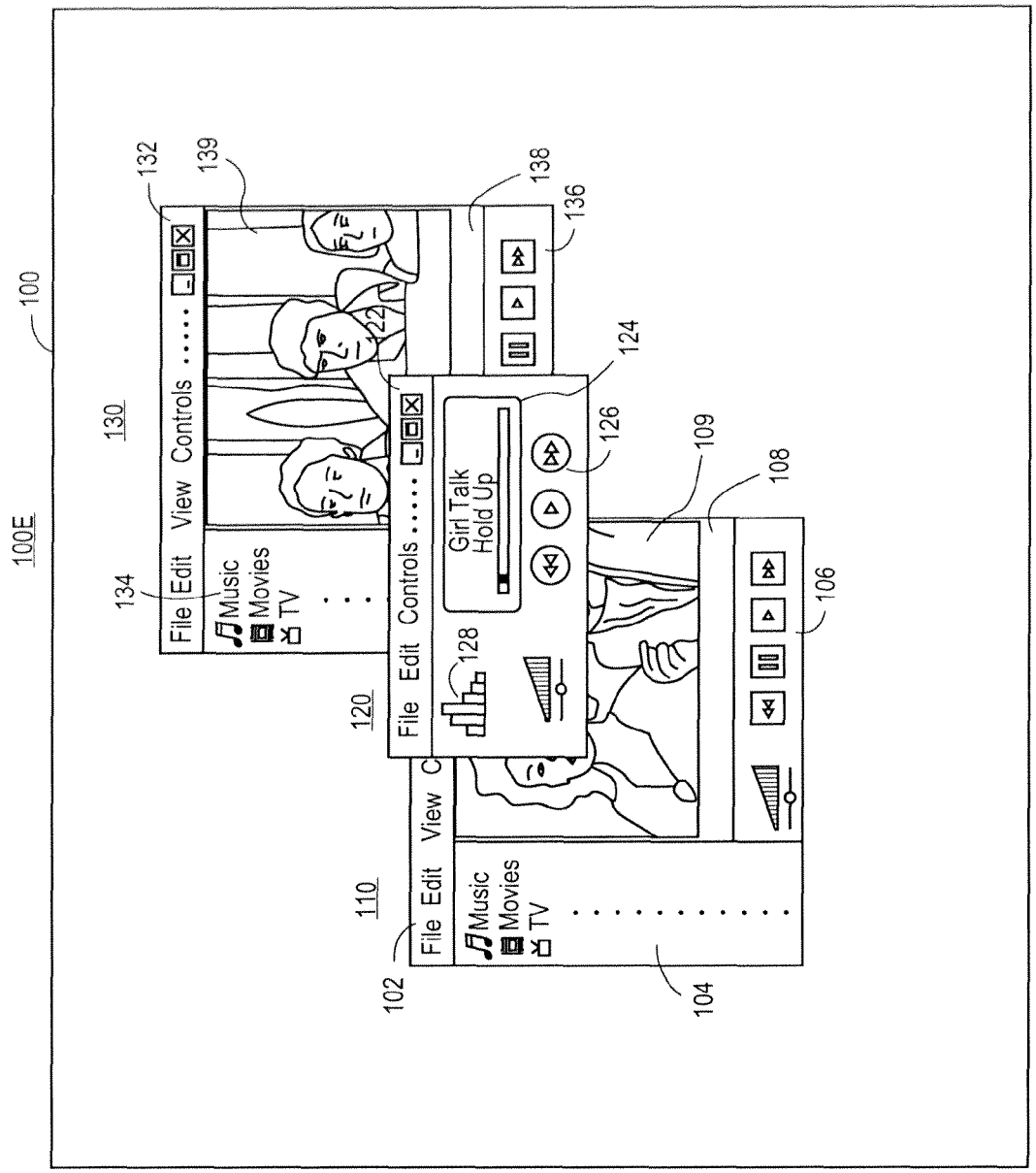

FIG. 1E shows an illustrative view of screen 100E showing a first video player window 110, audio player window 120, and a second video player window 130. Video player window 130 is substantially similar to video player window 110. As shown, audio player window 120 and second video player window 130 partially overlap first video player window 110. In addition, audio player window 120 can partially overlap video player window 130. A portion of media viewing pane 108 showing media content 109 may no longer be visible in screen 100. In addition, a portion of video viewing pane 138 showing video content 139 may no longer be visible in screen 100.

In certain embodiments, the volume of the audio associated with playing media in video player window 110 may be reduced based on the number of windows overlapping a portion of the window of video player window 110. For example, as illustrated in FIG. 1E, two windows are overlapping media content 109 of video player 120—audio player window 120 and second video player window 130. Thus, the volume of the audio associated with playing media in video player window 110 may be reduced by a percentage that is twice the amount of the portion of video player window 110 that is overlapped. The percentage may be capped at a maximum of percentage—e.g. 100%. As illustrated in FIG. 1E, about 40% of video player window 110 is overlapped by two overlapping windows in screen 100. Thus, the volume of the audio may be reduced by 80%. In certain embodiments, the option to reduce the volume of the audio based on the number of windows obscuring a portion of a particular window may be user selected.

Figure 1F:
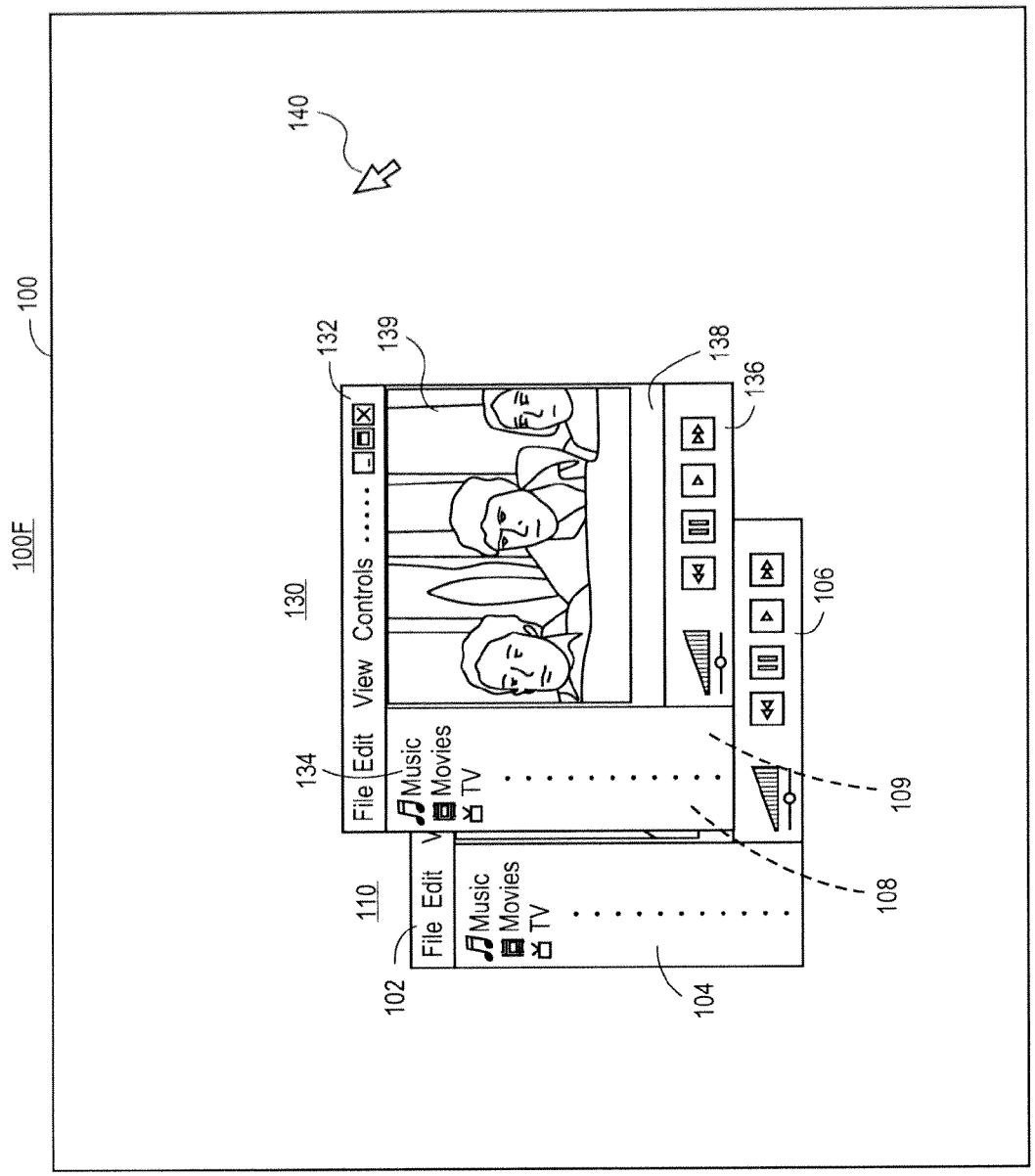

FIG. 1F shows an illustrative view of screen 100F showing first video player window 110 and second video player window 130. In addition, audio player window 120 is located entirely outside of screen 100. Thus, the volume of the audio currently playing in audio player window 120 may be completely muted. In addition, media viewing pane 108 showing media content 109 is no longer visible in screen 100. Thus, the volume of the audio associated with playing media in video player window 110 may be completely muted. In certain embodiments, the user may use operating system control bar 132 in connection with stylus 140 to minimize video player window 110. Thus, the volume of the audio may be completely muted. In other embodiments, the user may use operating system control bar 132 in connection with stylus 140 to relocate video player window 130. During the relocation, a portion of media content 138 may be uncovered. In certain embodiments, the volume of the audio associated with the playing media in video player window 110 may change dynamically as a result of the uncovering. Thus, the volume of the audio associated with the playing media in video player window 110 may change dynamically based on the percentage of the portion of video content 108 that is visible in screen 100. The option to dynamically reduce the volume of the audio associated with a particular window may be user selected.

FIG. 1G shows an illustrative view of screen 100G showing video player window 110 and error window 150 overlapping each other in one configuration. Error window 150 may be generated by another computer application, an operating system, or any suitable computer program. In all cases, the positioning of error window 150 may be automatically determined by a computer program rather than through user actions. As illustrated in FIG. 1G, error window 150 overlaps video player window 110. In certain embodiments, the volume of the audio may be reduced or adjusted in accordance with embodiments of the invention.

The embodiments disclosed in FIGS. 1B-1G above may apply to any window in screen 100, and are not limited to the interactions between windows explicitly disclosed above. For example, the embodiments disclosed above may apply to other media players, computer games, internet browsers, or any suitable computer application windows that contain media content with audio. In one embodiment, the window may be a video window in iTunes. The video window may play audio/video media that is protected by digital rights management technology, or DRM technology.

Figure 2:
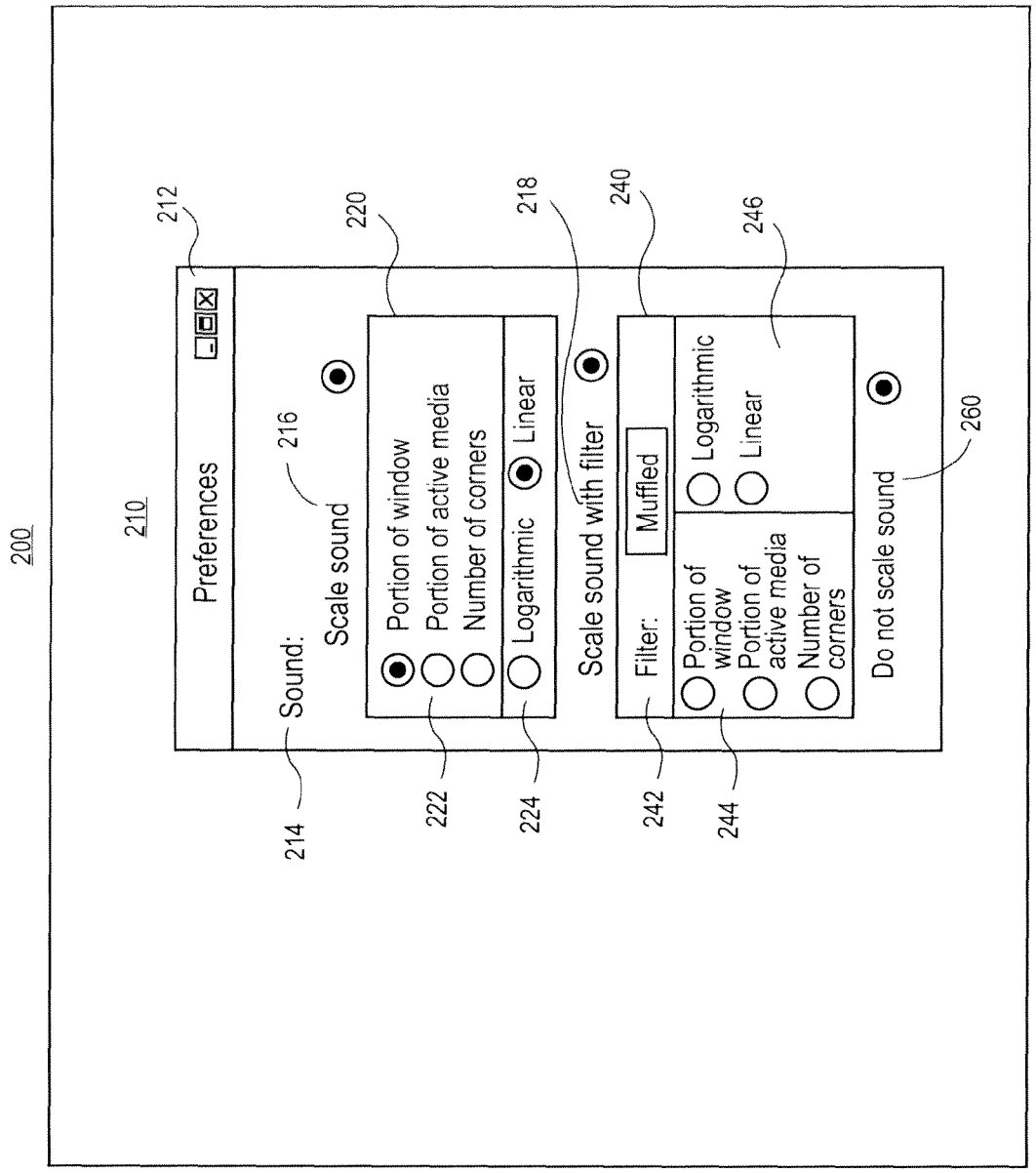
FIG. 2 shows an illustrative menu of audio variance preferences the user may select to vary the audio of particular windows in accordance with an embodiment of the invention.

FIG. 2 shows an illustrative view 200 of screen 200 showing preferences window 210. Preferences window 210 may allow the user to set preferences associated with scaling the volume of the audio associated with multiple windows that are playing media. Preferences window 210 may define preferences that affect the windows associated with a particular program, the windows associated with a set of particular programs, or all of the windows associated with an interactive operating system environment. In one example, preferences window 210 may define how the volume of the audio associated with the playing media in the windows of a particular media player, computer game, internet browser, or any other suitable computer application, are adjusted. In another example, preferences window 210 may define how the volume of the audio associated with the playing media in the windows of all media players, computer games, internet browsers, or any other suitable set of particular computer programs, are adjusted. In yet another example, preferences window 210 may define how the volume of the audio associated with the playing media in all of the windows in screen 100 are adjusted, as well as those windows which are minimized or off screen.

Preferences window 210 may be accessed through a set of menus in a particular computer program, or through a set of menus associated with the operating system. The selections made in preferences window 210 may be stored in a preferences file in the interactive operating system environment. The preferences file may be stored on the user's hard drive, a network server, or any suitable storage space. In a Windows operating system environment, the preferences file may be a registry key, environment variable, or any suitable configuration file. In a Mac OS X operating system environment, the preferences file may be a defaults database. In a Linux operating system environment, the preferences file may be computer files in a home folder.

Preferences window 210 can include preferences window control bar 210 and submenus 220 and 240. Preferences window control bar 210 may be substantially similar to operating system control bars 102, 122, and 132 of video player window 110, audio player window 120, and video player window 130, respectively. Submenus 220, 240, and option 260 may be labeled by main submenu heading 214. Main submenu heading 214 may indicate the scope of the preferences in preferences window 210. For example, main submenu heading 214 may indicate that preferences window 210 defines the user's preferences for all windows associated with a particular computer program, all windows associated with a particular set of computer programs, all windows in the operating system, or any suitable scope of preferences window 210.

Audio scaling submenu 220 may define all of the preferences available to the user if they wish to scale the audio content of multiple windows playing media content. Audio scaling submenu 220 may be labeled by audio scaling submenu option 216. Audio scaling submenu option 216 may determine whether the operating system scales the volume of the audio of the playing media in the windows controlled by preferences window 210.

Audio scaling submenu option 216 can include a radio button, checkmark box, or any suitable selectable menu option. If audio scaling submenu option 216 is a radio button, than audio scaling with filter submenu option 218 and option 260 may be radio buttons as well. In certain embodiments, the selection of one of radio buttons corresponding to options 216, 218, and 260 may be mutually exclusive (e.g. only one of the three options may be selected). Audio scaling submenu option 216 may determine if the preferences contained within audio scaling submenu 220 are user selectable. For example, if audio scaling submenu option 216 is selected, the options within audio scaling submenu 216 may be user selectable. Otherwise, the options within audio scaling submenu 216 may not be user selectable, and may be displayed in a different font style than the user selectable preference options in preferences window 210. In certain embodiments, if audio scaling submenu option 216 is not selected, the options within audio scaling submenu 220 may not be visible in screen 100.

Audio scaling submenu 220 can include portion preferences submenu 222 and scaling preferences submenu 224. Portion preferences submenu 222 may contain options specifying how the volume of the audio of the playing media in the windows controlled by preferences window 210 are scaled when the windows overlap in screen 100. Portion preferences submenu 222 may contain an option specifying that the audio of the windows controlled by preferences window 210 are scaled based on the portion of the each window that is visible on the screen. Selecting this option may provide a drop-down menu of visibility parameters. The visibility parameters may define how the portion of the window visible on the screen is calculated. In another example, the portion of the window may be defined as the portion of particular elements of the window that are visible in the screen.

In addition, portion preferences submenu 222 may contain an option specifying that the audio will be scaled based on the portion of the border of the window that is visible on the screen. Selecting this option may provide a drop-down menu, which contains further visibility parameters that define how the portion of the border of the window that is visible on the screen is calculated. For example, the portion of the border visible may be calculated as the proportion of the corners that are visible in the border of the window, the length of the perimeter of the border that is visible, or any other suitable measurement.

In addition, portion preferences submenu 222 may contain an option specifying that the volume of the audio may be calculated based on the portion of active media visible in screen 100. The portion of the active media may be calculated as the percentage of the video content that is visible in a video player. Portion preferences submenu 222 may also contain an option specifying whether the audio of media playing windows is adjusted when the windows are automatically positioned over at least a portion of the media playing window. For example, if this option is selected and an error message overlaps a portion of a particular window playing media, the volume of the audio associated with the playing media may not be scaled according to the rest of the preferences selected in preference window 210.

Scaling preferences submenu 224 may contain options specifying how the volume of the audio of the media playing in the windows controlled by preferences window 210 are scaled when the windows overlap. Scaling preferences submenu 224 may contain an option specifying that the volume of the audio will be scaled linearly based on the portion of the windows that are no longer visible. In addition, scaling preferences submenu 224 may contain an option specifying that the volume of the audio be scaled logarithmically based on the portion of each window that is no longer visible. Scaling preferences submenu 224 may contain an option specifying that the volume of the audio will be dynamically scaled when the windows are relocated.

Audio scaling with filter submenu 240 may define all of the preferences available to the user if they wish to digitally process the audio of the media playing in the windows controlled by preferences window 210. Audio scaling with filter submenu 240 may be labeled by audio scaling with filter submenu option 218. Audio scaling submenu with filter option 218 may determine whether the operating system digitally processes the audio of multiple windows playing media content in addition to scaling the volume of the audio. Audio scaling with filter submenu option 218 can include a radio button, checkmark box, or any suitable selectable menu option. Audio scaling with filter submenu option 218 may determine if the preferences contained within audio scaling with filter submenu 240 are user selectable similar to the approach disclosed with respect to audio scaling submenu option 216 and audio scaling submenu 220.

Audio scaling with filter submenu 240 can include digital processing selection menu 242, portion preferences submenu 244, and scaling preferences submenu 246. Digital processing selection menu 242 may contain options specifying how the audio of the windows controlled by preferences window 210 are digitally processed when the windows overlap. In certain embodiments, digital processing selection menu 242 may contain a drop-down box with a user selectable list of digital filters and audio processing effects. Filters may include high-pass filters, a low-pass filters, or other suitable audio filters. Digital effects may include echo effects, flanger effects, phaser effects, or other suitable audio effects. As a result of being digitally processed, the audio may be limited in frequency range.

Portion preferences submenu 244 may contain options specifying how the volume of the audio of the media playing in the windows controlled by preferences window 210 are scaled when the windows overlap. These options may be similar to the options in portion preferences menu 222 disclosed with respect to audio scaling submenu 220. Scaling preferences submenu 246 may contain options specifying how the audio are scaled when windows overlap. These options may be similar to the options in scaling preferences menu 222 disclosed with respect to audio scaling submenu 220.

Option 260 may contain an option specifying whether the volume of the audio of the playing media in the windows controlled by preferences window 210 are scaled. For example, if option 260 is selected, the volume of the audio of the windows controlled by preferences window 210 may not be scaled. In certain embodiments, option 260 may override all other user selectable options in preferences window 210.

Figure 3:
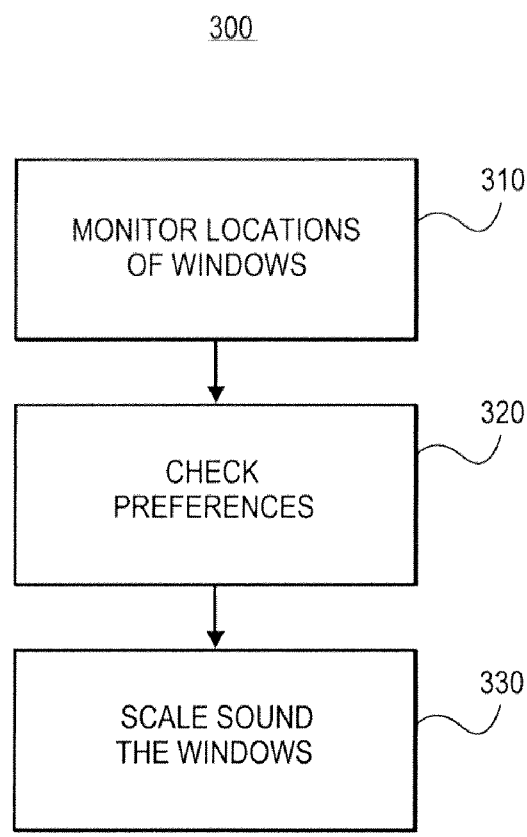
FIG. 3 shows an illustrative process for varying the audio of multiple windows in accordance with an embodiment of the invention.

FIG. 3. shows an illustrative process 300 for varying the audio of multiple windows. At step 310, the location of windows may be monitored. The windows can include the set of all windows associated with a particular program, all windows associated with a particular set of programs, or all windows in an operating system. In certain embodiments, the relative positions of the windows in a screen may be monitored. In one embodiment, the vertical position, horizontal position, length, width, and position in relation to the foreground of the screen for each window can be continually updated. The updating may occur once every processing cycle in the operating system, or any other suitable frequency.

The relative positions of the windows in the screen may be used to determine whether conditions have been met. One of these conditions may include determining whether any of the windows overlap in the screen. Determining whether the windows overlap in the screen may include determining what portion of the window is visible in the screen, determining how many windows are in the foreground overlapping a particular window, or determining any other suitable visibility parameters discussed with respect to the embodiments in FIGS. 1B-1G. These determinations may occur once every determination interval (e.g. once every processing cycle in the operating system, or any other suitable frequency). In certain embodiments, the determination interval may be user selected. In addition, step 310 may determine whether a window is off-screen, if a window is minimized, or any suitable set of conditions which may cause the audio of a media playing window to be adjusted.

At step 320, the preferences of the user may be checked. The preference check may take into account the information concerning the location of the windows monitored in step 310. In addition, the preference check may take into account whether various sets of conditions were met in step 310. In one embodiment, the preference check may compare the various visibility parameters determined in step 310 to a preference file in order to determine how to adjust the audio of the playing media in the windows monitored in step 310.

At step 330, the audio associated with the media playing in the windows can be scaled. More specifically, the volume of the audio associated with the playing media in the windows may be scaled. The scaling may be determined by the location of the windows monitored in step 310 as well as the preference check and visibility parameter check in step 320. The audio scaling may be accomplished by the CPU of the computer, or may be accomplished by dedicated audio processing circuitry.

Figure 4:
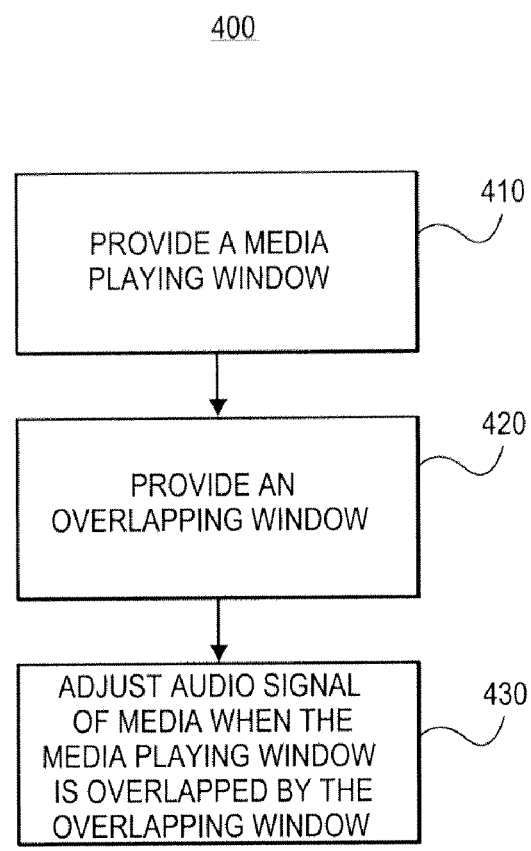
FIG. 4 shows an illustrative process for varying the audio of overlapping windows in accordance with an embodiment of the invention.

FIG. 4 shows an illustrative process 400 for varying the audio of overlapping windows. At step 410, a media playing window may be provided. The media playing window may be a window associated any suitable computer application or GUI. The media playing window may comprise media that includes an audio. The audio may be playing at a particular volume.

At step 420, an overlapping window may be provided. The overlapping window may be operable to be positioned over a portion of the media playing window. The overlapping window may be associated with any suitable computer application or GUI. The overlapping window may visually obscure the contents of the media playing window.

At step 430, the audio of the media is adjusted when the media playing window is partially overlapped by an overlapping window. The audio may be adjusted in a variety of ways according to a variety of conditions as disclosed above.

The foregoing describes systems and methods for varying multiple sources of audio in an interactive interface on a personal computer. One skilled in the art will appreciate that the invention can be practiced by other than the disclosed embodiments, which are presented for purposes of illustration and not of limitation, and the present invention is limited only by the claims that follow.

What is claimed is:

1. A method performed by a data processing system, the method comprising:
    displaying a media playing window that plays audio, the media playing window including a plurality of window elements, wherein each window element is a window control element or a display pane element, the window control element selectable to control the playing of the audio, the display pane element to display content information of the audio played by the media playing window, wherein the window elements include at least one window control element;
    displaying a second window that overlaps at least a portion of one or more of the window elements in the media playing window;
    determining a visibility parameter from a measure of a visible portion of the one or more window elements in the media playing window based at least in part upon the second window overlapping the at least a portion of the one or more window elements in the media playing window; and
    adjusting the audio of the media according to the visibility parameter.

2. The method of claim 1, wherein adjusting comprises reducing a volume level of the audio.

3. The method of claim 1, wherein adjusting comprises linearly scaling a volume level of the audio.

4. The method of claim 1, wherein adjusting comprises logarithmically scaling a volume level of the audio.

5. The method of claim 1, further comprising:
    determining an overlap percentage of the media playing window; and
    adjusting the audio based, at least in part, on the determined overlap percentage.

6. The method of claim 1, further comprising:
    determining the number of overlapping windows that overlap the media playing window; and adjusting the audio based, at least in part, on the determined number of overlapping windows.

7. The method of claim 1, further comprising adjusting the audio based, at least in part, on user-defined preferences.

8. The method of claim 1, further comprising receiving user input to position the at least one overlapping window over at least a portion of the media playing window.

9. The method of claim 1, further comprising automatically positioning the overlapping window over at least a portion of the media playing window.

10. A method performed by a data processing system, the method comprising:
   displaying a media playing window that plays media at a volume level, the media playing window including a plurality of window elements, each window element being a window control element or a display pane element, the window control element selectable to control the playing of the audio, the display pane element to display content information of the audio played by the media playing window, wherein the window elements include at least one window control element;
   determining at least one media playing window visibility parameter from a measure of a visible portion of one or more of the window elements in the media playing window; and
   adjusting the audio of the media based, at least in part, on the at least one determined visibility parameter.

11. The method of claim 10, wherein the at least one visibility parameter includes the percentage of a media playing window not overlaid by another window, the number of other windows overlapping the media playing window, which portions of the media playing window are covered, the number of visible corners of the media playing window, the portion of the perimeter of the border of the media playing window that is covered, whether the media playing window is the foremost window in the GUI, or whether the media playing window is minimized.

12. The method of claim 10, further comprising:
   displaying at least a first overlapping window; and
   positioning the first overlapping window over at least a portion of the media playing window, wherein the at least one visibility parameter changes in response to the relative positions of the media playing window and the first overlapping window.

13. The method of claim 10, wherein the media comprises video with corresponding audio and the media playing window comprises a region for displaying the video, and wherein the at least one visibility parameter is related to the portion of the region that is covered.

14. The method of claim 10, wherein adjusting comprises reducing the volume level to a level between minimum volume level and a maximum volume level.

15. The method of claim 10, further comprising adjusting the audio of the playing media in the media playing window while the media playing window is being moved.

16. A method performed by a data processing system, the method comprising:
   displaying a media playing window that plays audio, the media playing window including a plurality of window elements, each window element being a window control element or a display pane window, the window control element selectable to control the playing of the audio, the display pane window to display content information of the audio played by the media playing window, wherein the window elements include at least one window control element;
   determining at least one media playing window visibility parameter from a measure of a visible portion of one or more of the window elements in the media playing window; and
   adjusting the audio of the playing media when the determined at least one visibility parameter is changed.

17. The method of claim 16, further comprising:
   selecting a determination interval; and
   determining the at least one visibility parameter every determination interval.

18. A program storage device storing a computer program, the computer program for execution by a computer system having a processor, a memory, and a display, the computer program, when executed by the computer system, performing the following:
   displaying a media playing window that plays audio, the media playing window including a plurality of window elements, each window element being a window control element or a display pane window, the window control element selectable to control the playing of the audio, the display pane window to display content information of the audio played by the media playing window, wherein the window elements include at least one window control element;
   displaying a second window that overlaps at least a portion of one or more of the window elements in the media playing window;
   determining a visibility parameter from a measure of a visible portion of the one or more window elements in the media playing window based at least in part upon the second window overlapping the at least a portion of the one or more window elements in the media playing window; and
   adjusting the audio of the media according to the visibility parameter.

19. The program storage device of claim 18, wherein adjusting comprises reducing a volume level of the audio.

20. The program storage device of claim 18, wherein adjusting comprises linearly scaling a volume level of the audio.

21. The program storage device of claim 18, wherein adjusting comprises logarithmically scaling a volume level of the audio.

22. The program storage device of claim 18, wherein the computer program is further operative to:
   determine an overlap percentage of the media playing window; and
   adjust the audio based, at least in part, on the determined overlap percentage.

23. The program storage device of claim 18, wherein the computer program is further operative to:
   determine the number of overlapping windows that overlap the media playing window; and
   adjust the audio based, at least in part, on the determined number of overlapping windows.

24. The program storage device of claim 18, wherein the computer program is further operative to adjust the audio based, at least in part, on user-defined preferences.

25. The program storage device of claim 18, wherein the computer program is further operative to receive user input to position the at least one overlapping window over at least a portion of the media playing window.

26. The program storage device of claim 18, wherein the computer program is further operative to automatically position the overlapping window over at least a portion of the media playing window.

27. A system for use in an interactive data processing system, the system comprising a processor operative to:
  display a media playing window that plays media at a volume level, the media playing window including a plurality of window elements, each window element is a window control element or a display pane element, the window control element selectable to control the playing of the audio, the display pane element to display content information of the audio playing by the media playing window, wherein the window elements include at least one window control element;
  determine at least one media playing window visibility parameter from a measure of a visible portion of the one or more window elements in the media playing window; and
  adjust the audio of the playing media based, at least in part, on the at least one determined visibility parameter.

28. The system of claim 27, wherein the at least one visibility parameter includes the percentage of a media playing window not overlaid by another window, the number of other windows overlapping the media playing window, which portions of the media playing window are covered, the number of visible corners of the media playing window, the portion of the perimeter of the border of the media playing window that is covered, whether the media playing window is the foremost window in the GUI, or whether the media playing window is minimized.

29. The system of claim 27, wherein the processor is further operative to:
  display at least a first overlapping window; and
  position the first overlapping window over at least a portion of the media playing window, wherein the at least one visibility parameter changes in response to the relative positions of the media playing window and the first overlapping window.

30. The system of claim 27, wherein the media comprises video with corresponding audio and the media playing window comprises a region for displaying the video, and wherein the at least one visibility parameter is related to the portion of the region that is covered.

31. The system of claim 27, wherein adjusting comprises reducing the volume level to a level between minimum volume level and a maximum volume level.

32. The method of claim 27, wherein the processor is further operative to adjust the audio of the playing media in the media playing window while the media playing window is being moved.

33. A system for use in an interactive data processing system, the system comprising a processor operative to:
  display a media playing window that plays audio, the media playing window including a plurality of window elements, each window element being a window control element or a display pane window, the window control element selectable to control the playing of the audio, the display pane window to display content information of the audio being played, wherein the window elements include at least one window control element;
  determine at least one media playing window visibility parameter from a measure of a visible portion of one or more of the window elements in the media playing window; and
  adjust the audio of the media dynamically when the at least one determined visibility parameter is changed.

34. The system of claim 33, wherein the processor is further operative to select a determination interval; and
  determine the at least one visibility parameter every determination interval.

* * * * *